May 10, 1966 D. H. GARRIOTT 3,250,277
AUTOMATIC CONTROLLED SUPPLY MEANS FOR A CORN HUSKING MACHINE
Filed March 30, 1965 6 Sheets-Sheet 2
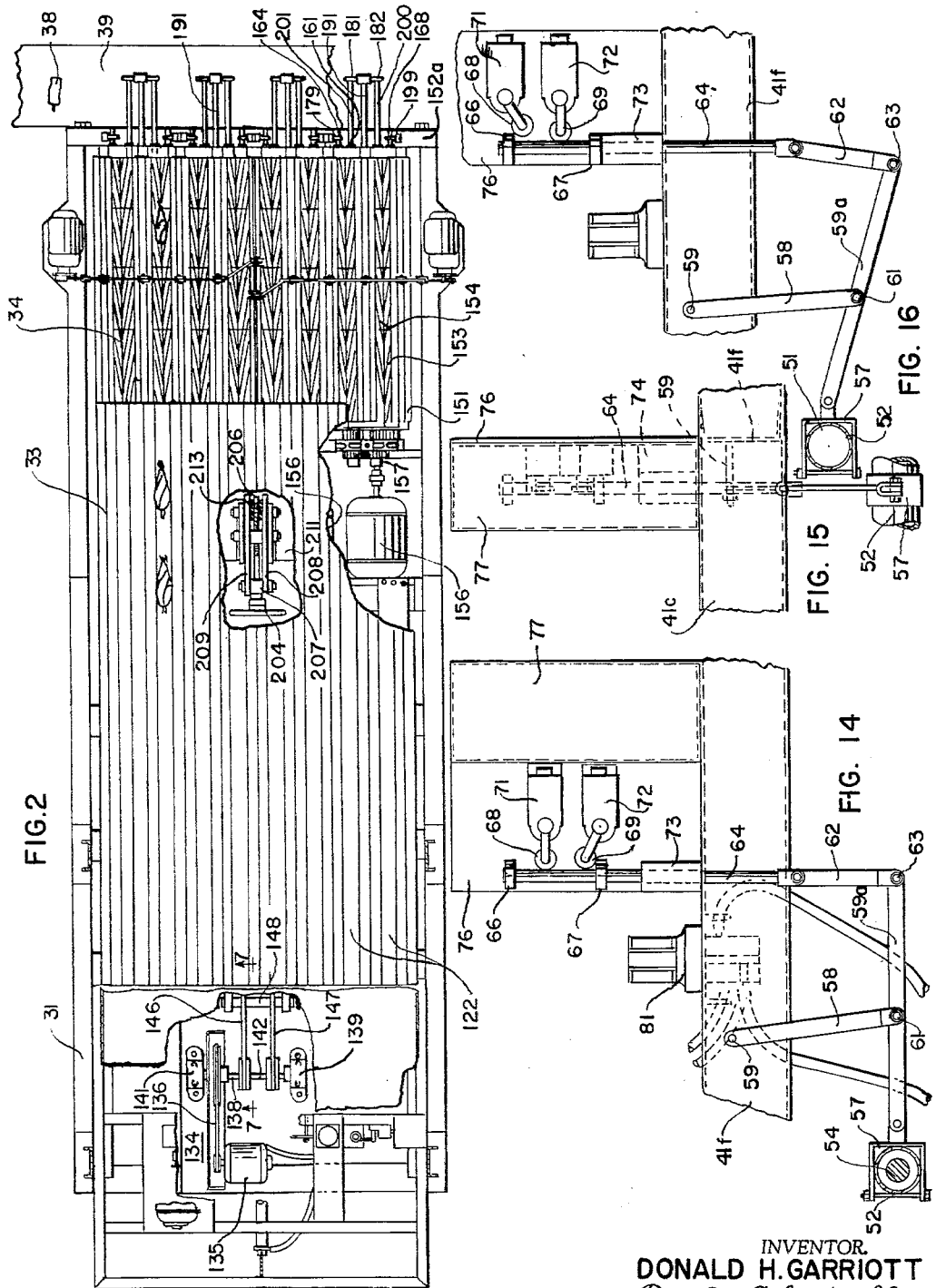
INVENTOR.
DONALD H. GARRIOTT
BY Pearce and Schaeperklaus
Attorneys.

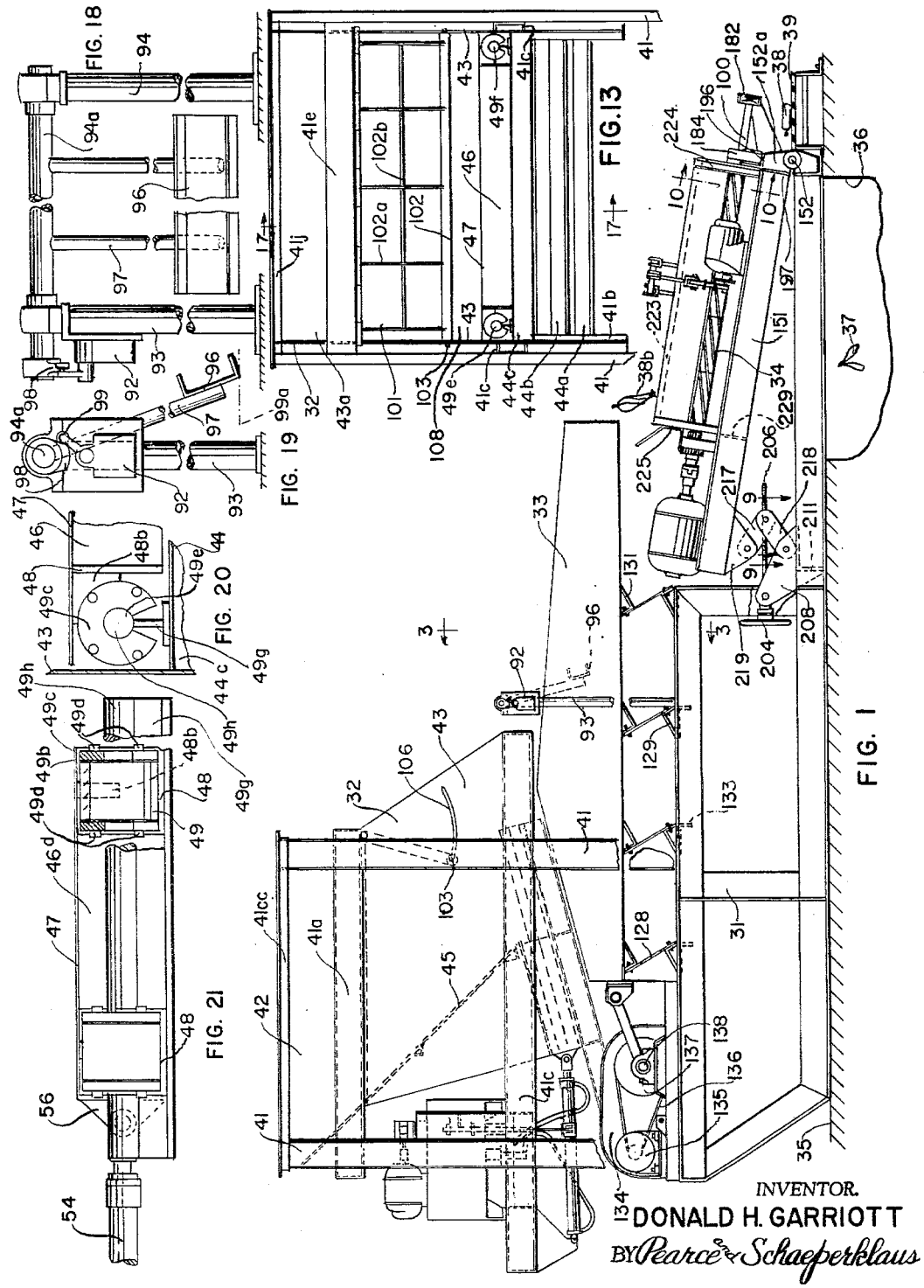

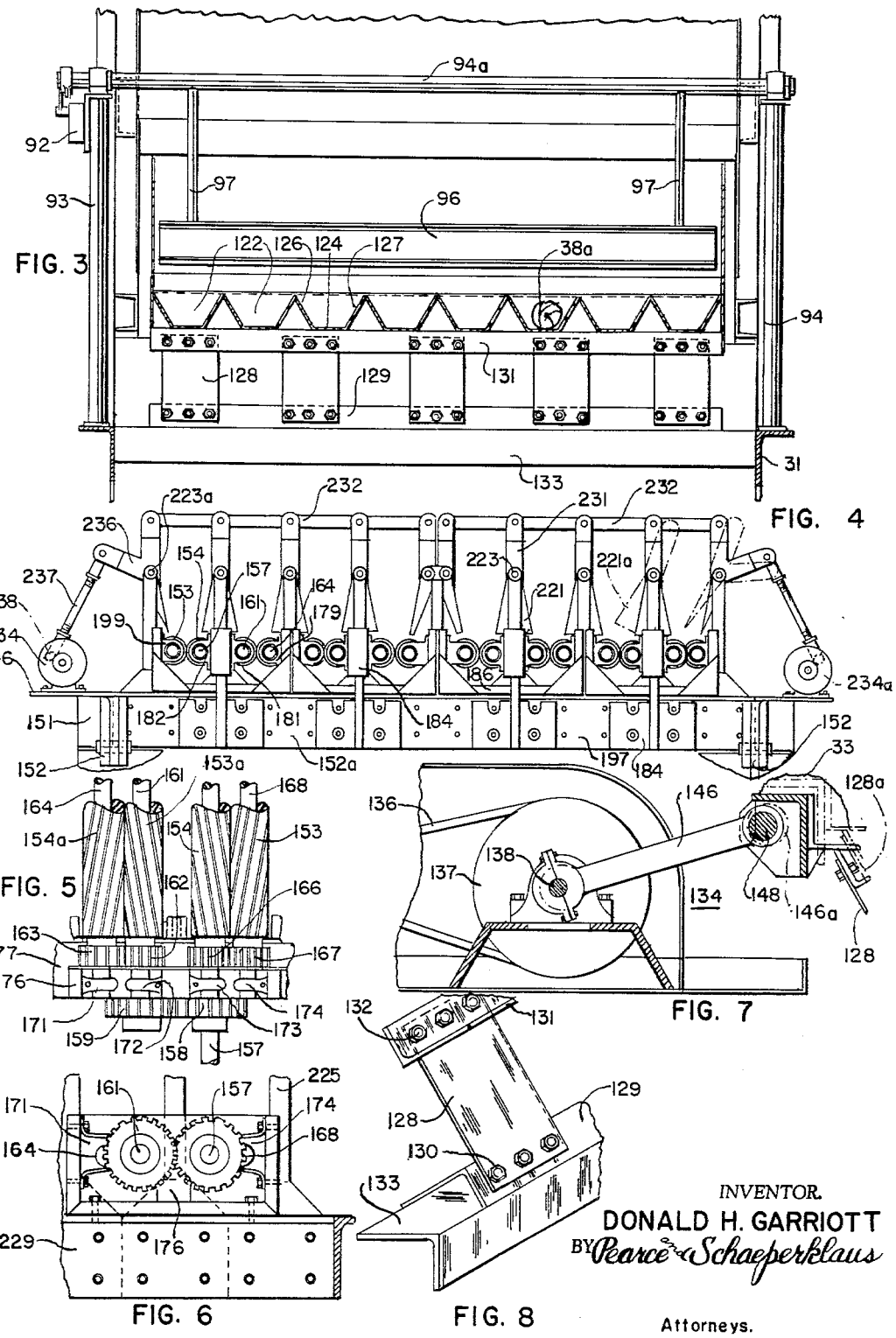

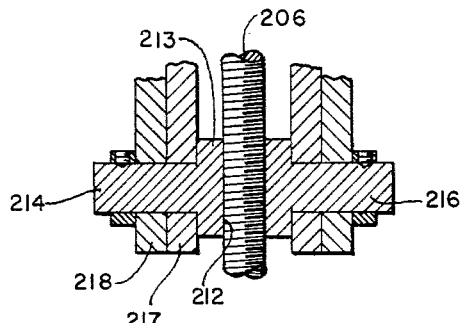
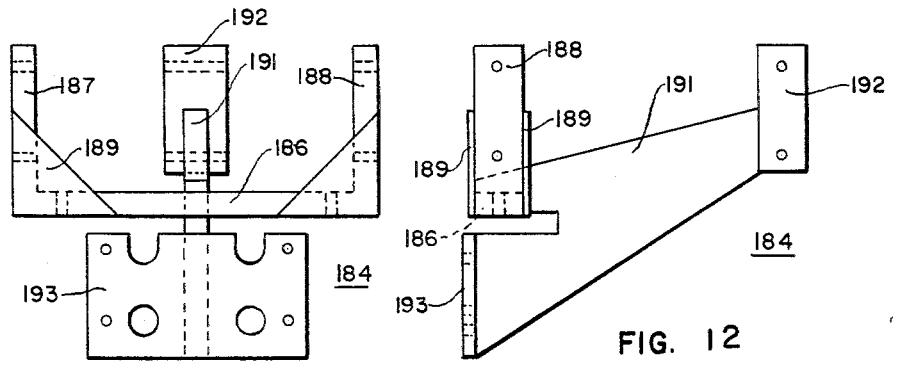
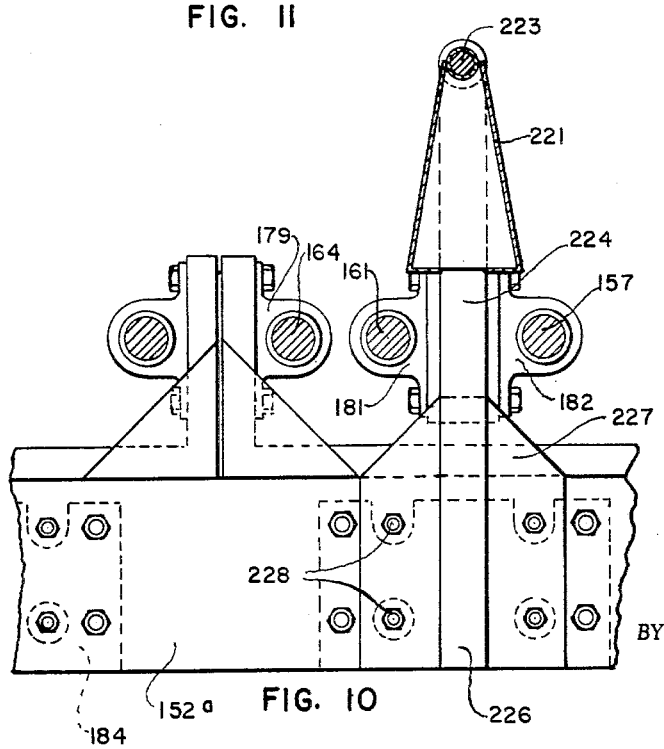

May 10, 1966 D. H. GARRIOTT 3,250,277
AUTOMATIC CONTROLLED SUPPLY MEANS FOR A CORN HUSKING MACHINE
Filed March 30, 1965 6 Sheets-Sheet 5
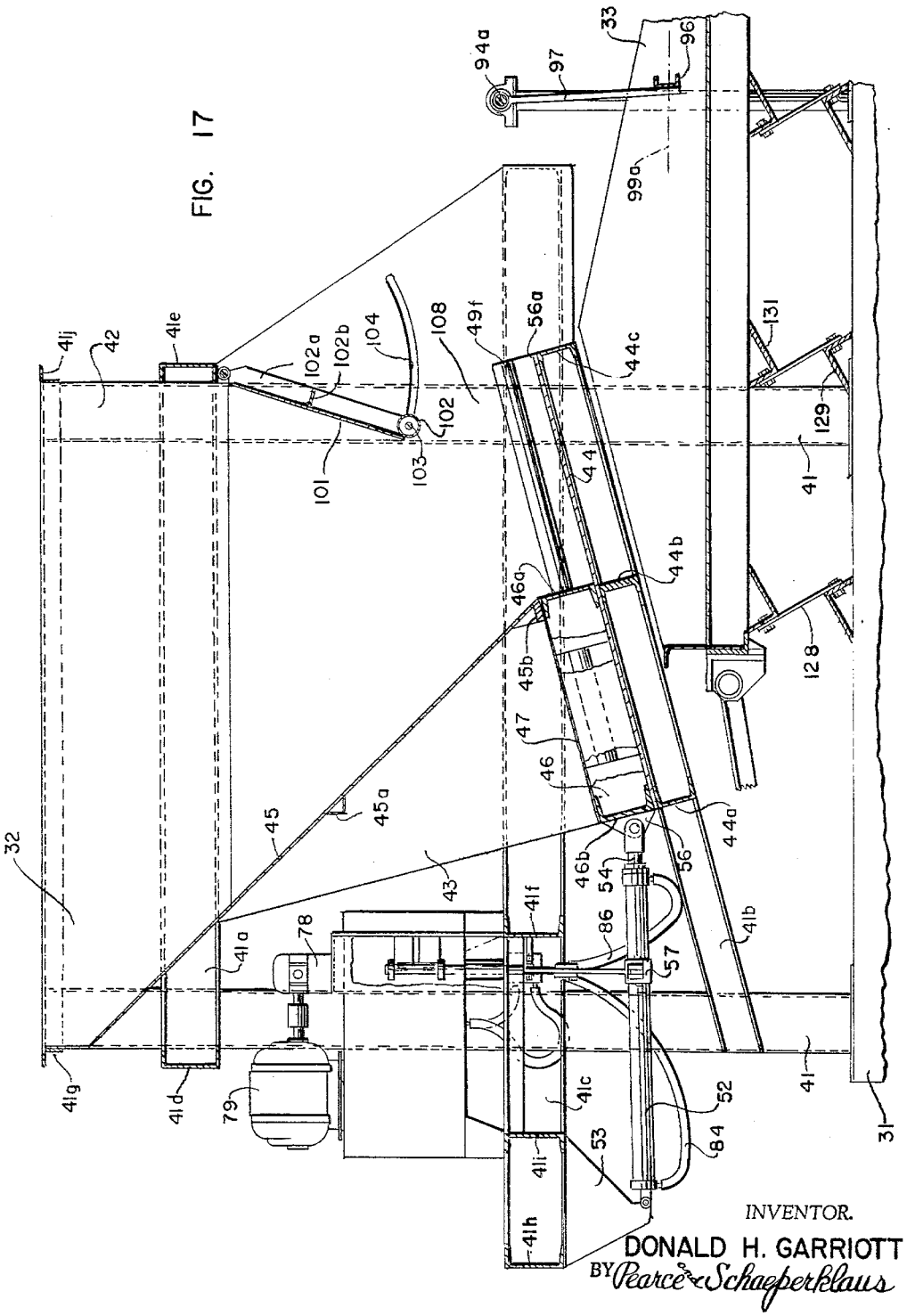
INVENTOR.
DONALD H. GARRIOTT
BY Pearce & Schaeperklaus
Attorneys

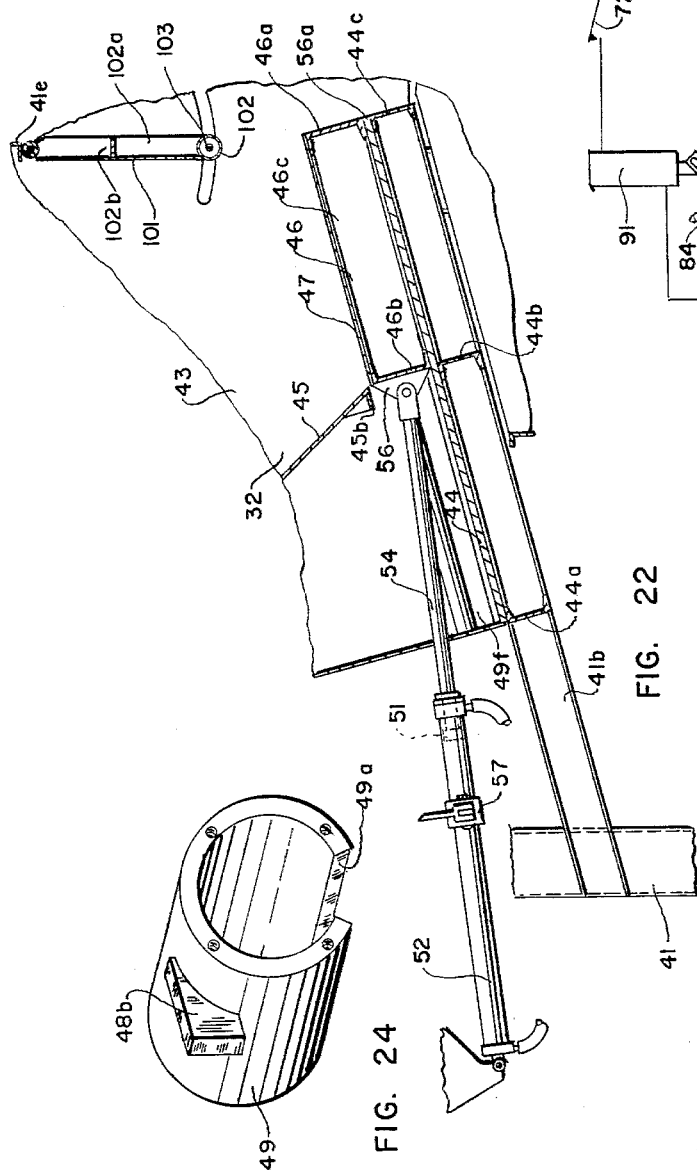

United States Patent Office 3,250,277
Patented May 10, 1966

3,250,277
AUTOMATIC CONTROLLED SUPPLY MEANS FOR A CORN HUSKING MACHINE
Donald H. Garriott, Scottsburg, Ind., assignor to Morgan Packing Company, Inc., Austin, Ind., a corporation of Indiana
Filed Mar. 30, 1965, Ser. No. 443,882
5 Claims. (Cl. 130—5)

This is a continuation-in-part of my copending application, Serial No. 192,689, filed May 7, 1962, now abandoned.

In the processing of corn (maize), outer husks must be removed from the ears of corn as an initial step in preparing the corn for further processing. In the past it has been usual to handle each ear of corn individually during husking.

An object of this invention is to provide a machine which aligns ears of corn and automatically feeds the ears of corn to husk-gripping rolls which draw husks from the ears of corn.

A further object of this invention is to provide a machine of this type in which unhusked ears of corn are loaded in a hopper at one end of the machine, in which the ears are advanced from the hopper into an aligning bin and aligned thereby, and in which the aligned ears are dropped end first into a husking section of the machine, the husking section including pairs of cooperating husking rolls which grip and draw the husks from the ears and in which skirt members aligned with the rolls swing transversely of the rolls to insure proper alignment of the ears of corn on the husking rolls and to re-align any ears which move out of alignment.

A further object of this invention is to provide a machine of this type in which the husking rolls are mounted on elongated shafts and in which the shaft of one of the husking rolls of each pair is substantially longer than the shaft of the other husking roll of the pair so that a portion of the longer shaft extends beyond the end of the other shaft, the husked ears being directed away from the machine by the extending portion.

A further object of this invention is to provide a machine of this type in which the hopper is provided with a loading device which advances ears into the aligning bin automatically and in which means is provided for controlling the loading device to advance ears into the aligning bin only so fast as the aligning bin can properly handle same.

The above and other objects and features of the invention will be apparent to those skilled in the art to which this invention pertains from the following detailed description, and the drawings, in which:

FIG. 1 is a view in side elevation of a corn husking machine constructed in accordance with an embodiment of this invention;

FIG. 2 is a top plan view thereof, parts of a feed hopper thereof being removed, other parts being broken away and in section to reveal details of construction;

FIG. 3 is a fragmentary view in section taken upon an enlarged scale and on the line 3—3 in FIG. 1;

FIG. 4 is a view in end elevation, and on an enlarged scale similar to that of FIG. 3 of a husking section of the machine, ear-aligning skirts being shown in a middle position in full lines and in a displaced position in dot-dash lines;

FIG. 5 is an enlarged fragmentary plan view showing a portion of the husking section;

FIG. 6 is a fragmentary view in end elevation of the portion of the husking section shown in FIG. 5;

FIG. 7 is an enlarged fragmentary view in section taken along the line 7—7 in FIG. 2;

FIG. 8 is an enlarged fragmentary perspective view showing one of the supports of the aligning section or bin;

FIG. 9 is an enlarged view in section taken on the line 9—9 in FIG. 1;

FIG. 10 is an enlarged view in section taken on the line 10—10 in FIG. 1;

FIG. 11 is a view in end elevation of a bearing support bracket which forms a portion of the machine;

FIG. 12 is a view in side elevation of the bracket shown in FIG. 11;

FIG. 13 is a fragmentary view in end elevation showing a hopper section of the machine;

FIG. 14 is a fragmentary view on an enlarged scale in rear end elevation showing a ram control mechanism of the machine in a first position;

FIG. 15 is a view in side elevation of the ram control mechanism illustrated in FIG. 14;

FIG. 16 is a view in rear end elevation showing the ram control mechanism of FIG. 14 in a second position;

FIG. 17 is a view in section on enlarged scale taken on the line 17—17 in FIG. 13, a ram being shown in retracted position;

FIG. 18 is a fragmentary view in end elevation on an enlarged scale showing details of construction of a flow control gate of the machine;

FIG. 19 is a fragmentary view in side elevation of the flow control gate illustrated in FIG. 18 in a raised position;

FIG. 20 is a fragmentary view in end elevation on an enlarged scale partly in section showing details of construction of one of the tracks and one of the bearings of the ram.

FIG. 21 is a view partly in side elevation and partly in section showing further details of construction of one of the tracks and bearings of the ram section;

FIG. 22 is a fragmentary view in section taken on the same line as FIG. 17 but showing the ram in extended position;

FIG. 23 is a schematic view of electrical connections of the machine; and

FIG. 24 is a perspective view of a bearing support assembly removed from the machine.

In the following detailed description and the drawing, like reference characters indicate like parts.

In FIG. 1 is shown a machine constructed in accordance with an embodiment of this invention. The machine includes a main framework 31 on which a loading hopper 32, an aligning bin 33 and a husking assembly 34 are mounted. The main framework 31 rests on a floor 35 which may have a well 36 therein for receiving husks 37 as the husks are removed from husked ears of corn 38 which are delivered onto a belt conveyor 39.

Unhusked ears of corn are loaded into the loading hopper 32. Details of the construction of the loading hopper 32 are shown in FIGS. 1, 13, and 17. The loading hopper includes upright frames 41 mounted on the main framework 31, lengthwise frames 41a, 41b, 41c (FIG. 17) and 41cc (FIG. 1) and cross frames 41d (FIG. 17), 41e, 41f, 41g, 41h, 41i, and 41j. Upper and lower side wall sections 42 and 43 (FIG. 1), an upper front plate 43a (FIG. 13) and a bottom plate 44 (FIG. 17) are mounted on the frames. Transverse frames 44a, 44b, and 44c space the lengthwise frames 41b and support the bottom plate 44 sloping upwardly and to the right, as shown in FIGS. 17 and 22. A sloping rear wall 45 guides ears of corn downwardly toward a ram 46. The rear wall is stiffened and supported by a central cross support 45a (FIG. 17) and a cross 45b at a lower edge thereof.

The ram 46 has a rectangular framework which includes a front channel 46a (FIG. 22), a rear channel 46b, and side channels 46c and 46d (FIG. 21). A plate 47 is mounted on the rectangular framework and, as shown in FIGS. 13 and 20, the plate 47 extends substantially the width of the loading hopper from one of the side wall sections 43 to the other of the side wall sections 43. A pair of upright plates 48 is mounted on each of the side channels 46c and 46d and, as shown in FIG. 20, bearing support assemblies are mounted thereon. A gusset plate 48b is attached to each upright plate 48 and to the underside of the plate 47. As shown in FIG. 24, each gusset plate 48b carries a bearing support sleeve 49 of substantially C-shape in section having an opening 49a therein. An appropriate bearing (not shown in detail) is received inside each bearing support sleeve and is held thereinside by C-shaped end plates 49b and 49c (FIG. 21) bolted to the bearing support sleeve 49 by bolts 49d. The bearings receive tracks 49e and 49f (FIGS. 13 and 20). Each of the tracks includes a base 49g (FIGS. 20 and 21) of inverted T-shape and a rod portion 49h which is received inside the bearings with the staff of the base of the track extending through the openings of the support sleeves and a cross bar thereof mounted on the plate 44, as shown most clearly in FIG. 20. The ram 46 and the plate 47 can reciprocate between the position shown in FIG. 17 and that shown in FIG. 22.

The ram is driven by a piston 51 (FIG. 22) which reciprocates inside a cylinder 52, which can be hydraulically driven. One end of the cylinder 52 is pivotally connected to a plate 53 (FIG. 17) which is attached to the cross frames 41h and 41i. A piston rod 54, which carries the piston 51, is pivotally connected to a plate 56 attached to the rear channel 46b of the ram framework. As the ram moves from the FIG. 17 position to the FIG. 22 position, ears of corn in front of the ram are pushed forwardly by the front channel 46a thereof to fall from a free edge 56a of the plate 44 into the aligning bin 33. The bottom plate 44 and the tracks slope upwardly and to the right as shown in FIGS. 17 and 22 so that, as the ram 46 moves from the FIG. 17 position to the FIG. 22 position, a clamp 57, mounted on the cylinder 52 moves upwardly from the position shown in FIGS. 14 and 17 to the position shown in FIGS. 16 and 22. The clamp 57 is connected to a linkage (FIGS. 14 and 16) including a link 58 pivotally mounted on a stud 59 which, in turn, is attached to the cross frame 41f, as shown in FIG. 15. A linking lever 59a (FIGS. 14 and 16) is pivotally connected to the clamp 57 at one end thereof and to the link 58 centrally thereof at 61. The other end of the linking lever 59 is pivotally connected to another link 62 at 63. The other end of the link 62 is pivotally connected to a lower end of a vertically reciprocating rod 64. The rod 64 carries collars 66 and 67 which, in turn, are engageable with switch actuators 68 and 69, respectively, for operating switches 71 and 72, respectively. The rod 64 is guided by a bushing 73 which is mounted on a plate 74 (FIG. 15). The plate 74, in turn, is attached to a plate 76 which is mounted on and attached to the cross frame 41f. The switches 71 and 72 are also mounted to the plate 76. A box 77 adjacent the switches 71 and 72 contains electrical apparatus of the machine associated with the switches 71 and 72.

Fluid under pressure for operating the cylinder is supplied by a pump 78 (FIG. 17) driven by a motor 79. A solenoid operated valve 81 (FIG. 14) controls flow of fluid to the cylinder 52. As shown in FIG. 23, fluid under pressure from the pump is supplied to the valve through a line 82 and fluid is returned to the pump through a line 83. When the valve is in the position shown, fluid under pressure is pumped along a line 84 to a left-hand end of the cylinder 52, as shown in FIG. 17, and fluid is returned from the righthand end of the cylinder 52 through a line 86. When the ram 46 reaches the FIGS. 22 and 16 position, the contacts of the switch 71 are closed. Electric power from line leads 87 and 88 (FIG. 23) energizes a solenoid 89 to swing the valve 81 to its alternate position in which the line 86 is connected to the pump line 82 and the line 84 is connected to the return line 83, and the ram is returned from the FIG. 22 position to the FIG. 17 position. When the ram reaches the FIG. 17 and FIG. 14 position, the switch 72 is actuated to close the contacts thereof to energize a solenoid 91 (FIG. 23) which returns the valve 81 to the FIG. 23 position to start the ram cycle over again, and the ram continues to move back and forth to cause delivery of unhusked ears of corn to the aligning bin so long as power is supplied to the solenoids. Power to the solenoids can be cut off by opening of a switch 92. As shown in FIGS. 1 and 3, the switch 92 is mounted on a standard 93. The standard 93 and another similar standard 94 are mounted on the main framework 31, as shown in FIG. 3, and pivotally support a cross rod 94a which overlies the aligning bin 33. A crossbar 96 of channel-shape is attached to the rod 94a by rods 97 to swing therewith. A cam 98 is mounted on the cross rod 94a, as shown in FIG. 19, and is engageable with a switch operator 99 when the bar 96 is swung from the FIG. 17 position to the FIGS. 1 and 19 position to open the contacts of the switch 92 and cut off power to the solenoids 89 and 91, as shown in FIG. 23. The crossbar 96 is engageable by ears of corn in the aligning bin when the level reaches dot-dash line level 99a indicated in FIGS. 17 and 19 to stop the operation of the ram when the level of corn in the aligning bin reaches this level.

A gate 101 is provided in the loading hopper, as indicated in FIGS. 13, 17, and 22. The gate 101 is hinged to a lower flange of the cross frame 41e and, at its lower edge, carries a stiffening pipe 102. Stiffening ribs 102a and 102b strengthen the gate 101. Plugs at the ends of the pipe 102 carry pins 103 (FIG. 13) which extend through arcuate slots 104 (FIG. 17) and 106 (FIG. 1) in the side walls 43 respectively. The gate 101 can be swung to varying positions, as shown in FIGS. 17 and 22, to control delivery of corn from the loading hopper 32, as the ram 46 reciprocates. The ears of corn are delivered through an opening 108 between the lower edge of the gate 101 and the bottom plate 44.

As already pointed out, unhusked ears of corn are loaded in the loading hopper 32 and are advanced therefrom into the aligning bin 33 by the ram 46 as long as the crossbar 96 is not engaged and raised by ears of corn in the aligning bin 33. The bin includes a plurality of troughs 122 (FIGS. 2 and 3). Each of the troughs 122 includes a bottom wall 124 (FIG. 3), which approximates in width the unhusked ear of corn 38a, and side walls 126 and 127 which slope downwardly and toward the bottom wall 124 to cause the ears of corn to line up with or become aligned in the troughs. As shown, the aligning bin includes eight troughs.

The aligning bin 33 is supported on a plurality of resilient plates 128, each of which can be formed of appropriate resilient material, such as resin-impregnated glass fiber material. As shown in FIG. 8, the lower ends of the resilient plates are mounted on a lower angle 129 by means of bolts 130, and upper ends are bolted to an upper angle 131 by bolts 132. The lower angles 129 are welded or otherwise firmly attached to cross frame members 133, as shown most clearly in FIG. 3. The upper angles 131 are welded or otherwise firmly attached to the underside of the aligning bin 33 so that the bin can swing or vibrate on the plates as the plates flex between the position in which the plate 128 is shown in full lines in FIG. 7 and the position shown in dot-dash lines at 128a. As the bin vibrates, the ears of corn are caused to advance from the left to the right, as shown in FIGS. 1 and 2.

The bin is caused to swing or vibrate by an eccentric drive indicated generally at 134 in FIGS. 1, 2, and 7. The drive includes a motor 135 (FIGS. 1 and 2) mounted on the main framework 31. The motor 135 drives a belt 136 which, in turn, drives a pulley 137. The pulley 137 is mounted on a crank shaft 138. The crank shaft 138 includes end portions journalled in bearings 139 and 141 (FIG. 2) and a central offset section 142. Connecting rods 146 and 147 extend from the offset section 142 to a transverse shaft 148 mounted on the underside of the underside of the aligning bin 33. As the crank shaft 138 turns, shaft 148 moves connecting rods between the position at which the connecting rod 146 is shown in full lines in FIG. 7 and the position shown in dot-dash lines at 146a causing the bin to vibrate up and to the right as shown in FIGS. 9 and 1 and to return downwardly and to the left. The vibration causes the unhusked ears of corn in the aligning bin to advance from the left to the right, as shown in FIGS. 1 and 2, as the crank shaft 138 turns.

When an unhusked ear of corn reaches the righthand end of the aligning bin 33, it falls downwardly, as indicated at 38b in FIG. 1, to the husking assembly 34. The husking assembly 34 includes a frame 151, which is hinged to the main framework 31 by hinges 152. Upper leaves of the hinges 152 are welded to a cross frame member 152a. As shown most clearly in FIG. 4, eight pairs of rolls 153 and 154 are rotatably mounted on the frame 151, each pair of rolls being aligned with one of the troughs of the aligning bin 33, as shown most clearly in FIG. 2. Four electric motors 156, only two of which are shown in FIG. 2, are mounted on the frame 151 of the husking assembly. Each motor 156 drives two pairs of husking rolls. As shown in FIG. 5, a motor driven shaft 157 carries a spur gear 158 which meshes with a companion spur gear 159 mounted on a roll shaft 161. The roll shaft 161 carries a pinion 162 which meshes with another pinion 163 mounted on a roll shaft 164. The motor driven shaft 157 also carries a pinion 166 which meshes with a companion pinion 167 mounted on a shaft 168. The shafts 168 and 157 carry the rolls 153 and 154. The shafts 161 and 164 carry rolls 153a and 154a. When the motor driven shaft 157 is turned, the rolls rotate therewith. The shaft 157 is rotated in a clockwise direction as shown in FIG. 6 and the shaft 168 is rotated counterclockwise, so that the mating faces of the rolls turn in a direction to draw husks downwardly therebetween. The faces of the rolls are grooved lengthwise, as shown in FIG. 5, so that the rolls can firmly grip the husks. The rolls can be formed of rubber or other suitable resilient material so that the faces of the rolls can yield resiliently to permit passage of husks therebetween. Bearings 171, 172, 173, and 174, which rotatably support upper ends of the shafts 164, 161, 157, and 168, respectively, are mounted on a bearing bracket 176 which, in turn, is mounted on a cross frame member 177. The bracket 176 is of generally E-shape, as shown in FIG. 6.

Lower ends of the shafts 164, 161, and 157 are rotatably mounted on lower bearings 179, 181, and 182, respectively (FIGS. 4 and 10). The lower bearings are mounted on lower bearing brackets 184.

Details of construction of one of the bearing brackets 184 are shown most clearly in FIGS. 11 and 12. The bracket 184 includes a body bar 186 on which upright bearing support arms 187 and 188 are mounted. Gusset plates 189 welded to the body bar 186 and to the support arms 187 and 188 hold the bearing support arms rigidly in position. An extension plate 191 is welded to the body bar 186 and extends outwardly from and perpendicularly to the body bar 186. A upright bearing support arm 192 is mounted on the outer end of a plate 191. A mounting plate 193 is welded to the inner end of the extension plate 191 below the body bar 186. The bracket 184 is mounted on the cross frame member 152a, as shown in FIG. 4, with the body bar 186 resting on an upper flange 196 of the cross frame member 152a and the mounting plate 193 engaging a face of an upright flange 197 on the cross frame member 152a. The body bar 186 and the mounting plate 193 are bolted to the flanges of the cross frame member 152a to rigidly mount the bracket 184 thereon. As shown most clearly in FIG. 4, each body bracket 184 supports four bearings with bearings 179 and 199 overlying the cross frame member 152a, as shown in FIG. 2, and the bearings 181 and 182 displaced therefrom a distance substantially equal to the length of the extension plate 191. Thus, the shafts 161 and 157 are longer than the shafts 168 and 164 and exposed end portions 200 and 201 of the shafts 157 and 161 respectively, extend to the right of the cross frame member 152a, as shown in FIGS. 1 and 2. As ears of corn are husked and progress along the husking rolls to the right, as shown in FIGS. 1 and 2, the ears engage the exposed end portions 200 and 201 of the shafts to be directed downwardly thereby to the conveyor 39 (FIGS. 1 and 2) which carries the husked ears 38 away from the machine.

The rate at which ears of corn travel along the husking rolls is determined by the angle of slope thereof. This angle of slope can be adjusted by turning an adjusting wheel 204 (FIGS. 1 and 2). The wheel 204 is mounted on and keyed to a threaded shaft 206. The shaft 206 is rotatably mounted in a bearing block 207 (FIG. 2) which, in turn, is pivotally mounted in upright plates 208 and 209. The plates 208 and 209, in turn, are mounted on a cross frame member 211 (FIGS. 1 and 2). The shaft 206 extends through an opening 212 (FIG. 9) in a block 213 and is threaded thereto. Trunnion extensions 214 and 216 of the block 213 are received in end portions of toggle links 217 and 218. Upper end portions of the links 217 are pivotally connected to plates 219 (only one of which is shown in FIG. 1) mounted on the underside of the husking section frame 151. Lower end portions of the toggle links 218 are pivotally connected to the plates 208 and 209. When the adjusting wheel 204 and the shaft 206 are turned, the block 213 can advance to the right or left, as shown in FIG. 1, to cause the toggle links to swing apart or toward each other to raise or lower the left-hand end of the husking section frame 151.

Ears of corn on the husking rolls are kept in alignment with the rolls by means of a plurality of skirt members 221 (FIG. 4). The skirt members 221 are mounted on lengthwise shafts 223 (FIG. 10). The shafts 223 are rotatably mounted at the upper ends of bearing posts 224 and 225 (FIG. 1). In FIG. 10, details of construction of one of the bearing posts 224 are shown in detail. The bearing post 224 includes an upright body 226 and a plate 227 welded or otherwise firmly attached thereto. As shown in FIG. 10, the plate 227 is bolted to the cross frame member 152a by bolts 228. Similarly, as shown in FIG. 6, the bearing posts 225 are bolted to a cross frame member 229. The lengthwise shafts 223 and the skirt members 221 are caused to swing or oscillate by cranks 231 (FIG. 4). Each of the cranks 231 is firmly attached to one of the lengthwise shafts 223. The cranks 231 are linked by transverse rods 232 pivoted thereto, so that cranks 232 swing in unison in groups.

Each group of cranks is caused to swing by one of a pair of motors 234 and 234a. The motor 234 is linked to a crank arm 236 by an adjustable link 237. The crank arm 236, in turn, is firmly attached to a lengthwise shaft 223a. The lower end of the link 237 is pivotally mounted on a crank shaft 238 driven by the motor 234. When the motors 234 and 234a turn, the skirt members 221 are swung from a normal position shown in full lines in FIG. 4 to a first displaced position shown in dot-dash lines at 221a to the left of the normal position, through the full line position to a second displaced position (not shown) to the right of the normal position and back to the normal position. As the skirts swing back and forth, the skirts catch any ears of corn which may rest on the husking rolls in non-aligned position and direct such ears to aligned position.

When the motors of the husking machine turn, ears of corn in the aligning bin 33 (FIGS. 1 and 2) progress along the aligning troughs to the open ends thereof and fall to the husking rolls. Normally, most ears will fall end first so that husks thereon are rapidly gripped by the husking rolls. As the ears pass along the husking rolls, the skirts 221 swing back and forth to insure proper alignment of ears with the husking rolls 153 and 154 so that the rolls can grip and draw husks from all the ears of corn. When the husked ears reach the lower ends of the husking rolls, the ears progress to exposed end portions 200 and 201 of the shafts which direct the husked ears downwardly to the conveyor 39.

The husking machine illustrated in the drawings and described above is subject to structural modification without departing from the spirit and scope of the appended claims.

Having described my invention, what I claim as new and desire to secure by Letters Patent, is:

1. A machine for husking ears of corn which comprises a loading hopper, a discharge ram mounted in the loading hopper, means for driving the discharge ram to deliver ears of corn from the hopper, an aligning bin receiving the ears of corn from the loading hopper in randomly oriented relation, said aligning bin having a plurality of elongated troughs, each of said troughs having a bottom wall of approximately the width of an ear of corn and side walls sloping downwardly toward the trough bottom wall, a gate mounted above the aligning bin and engageable by ears of corn in the aligning bin, means connected to the gate and controlling the ram driving means so that the ram delivers the ears of corn when the level of ears in the aligning bin at the gate is below a predetermined level, means for vibrating the aligning bin lengthwise of the troughs to cause the ears to progress along the aligning bin, the side walls and bottom walls of the troughs causing the ears to become aligned in the troughs with the side walls of the troughs, ends of the troughs remote from the loading hopper being open, a husking assembly receiving the ears of corn from the open ends of the troughs of the aligning bin, the husking assembly including cooperating pairs of rotatably mounted husking rolls receiving ears from the troughs, there being a pair of rolls for each trough, axes of the rolls sloping downwardly away from the open ends of the troughs, and means for rotating the husking rolls to cause the husking rolls to engage husks and withdraw the husks from the ears as the ears pass along the rolls, to remove the husks from the ears.

2. A machine for husking ears of corn which comprises a loading hopper, a discharge ram mounted in the loading hopper, means for driving the discharge ram to deliver ears of corn from the hopper, an aligning bin receiving the ears of corn from the loading hopper in randomly oriented relation, said aligning bin having a plurality of elongated troughs, each of said troughs having a bottom wall of approximately the width of an ear of corn and side walls sloping downwardly toward the trough bottom wall, a gate mounted above the aligning bin and engageable by ears of corn in the aligning bin, means connected to the gate and controlling the ram driving means so that the ram delivers the ears of corn when the level of ears in the aligning bin at the gate is below a predetermined level, means for vibrating the aligning bin lengthwise of the troughs to cause the ears to progress along the aligning bin, the side walls and bottom walls of the troughs causing the ears to become aligned in the troughs with the side walls of the troughs, ends of the troughs remote from the loading hopper being open, a husking assembly receiving the ears of corn from the open ends of the troughs of the aligning bin, the husking assembly including cooperating pairs of rotatably mounted husking rolls receiving ears from the troughs, there being a pair of rolls for each trough, axes of the rolls sloping downwardly away from the open ends of the troughs, means for rotating the rolls to cause the rolls to engage husks and withdraw the husks from the ears as the ears progress along the rolls, upright skirt members pivotally mounted above the rolls of each pair and aligned with the rolls for guiding the ears as the ears fall from the troughs to the husking section and means for oscillating the skirt members transversely of the rolls to align the ears with the rolls.

3. A machine for husking ears of corn which comprises a loading hopper, a discharge ram mounted in the loading hopper, means for driving the discharge ram to deliver ears of corn from the hopper, an aligning bin receiving the ears of corn from the loading hopper in randomly oriented relation, said aligning bin having a plurality of elongated troughs, each of said troughs having a bottom wall of approximately the width of an ear of corn and side walls sloping downwardly toward the trough bottom wall, a gate mounted above the aligning bin and engageable by ears of corn in the aligning bin, means connected to the gate and controlling the ram driving means so that the ram delivers the ears of corn when the level of ears in the aligning bin at the gate is below a predetermined level, means for vibrating the aligning bin lengthwise of the troughs to cause the ears to progress along the aligning bin, the side walls and bottom walls of the roughs causing the ears to become aligned in the troughs with the side walls of the troughs, ends of the troughs remote from the loading hopper being open, a husking assembly reeciving the ears of corn from the open ends of the troughs of the aligning bin, the husking assembly including cooperating pairs of rotatably mounted husking rolls receiving ears from the troughs, there being a pair of rolls for each trough, axes of the rolls sloping downwardly away from the open ends of the troughs, means for rotating the rolls to cause the rolls to engage husks and withdraw the husks from the ears as the ears progress along the rolls, upright skirt members pivotally mounted above the rolls of each pair and aligned with the rolls for guiding the ears as the ears fall from the troughs to the husking section, means for oscillating the skirt members transversely of the rolls to align the ears with the rolls, at least one of the rolls of each pair being mounted on a shaft, said shaft extending beyond a lower end of the other roll of the pair to urge the ears downwardly as the ears leave the husking rolls.

4. A machine for husking ears of corn which comprises a loading hopper, a discharge ram mounted in the loading hopper, means for driving the discharge ram to deliver ears of corn from the hopper, an aligning bin receiving the ears of corn from the loading hopper in randomly oriented relation, said aligning bin having an elongated trough, said trough having a bottom wall of approximately the width of an ear of corn and side walls sloping downwardly toward the trough bottom wall, a gate mounted above the aligning bin and engageable by ears of corn in the aligning bin, means connected to the gate and controlling the ram driving means so that the ram delivers the ears of corn when the level of ears in the aligning bin at the gate is below a predetermined level, means for vibrating the aligning bin lengthwise of the trough to cause the ears to progress along the aligning bin, the side walls and bottom wall of the trough causing the ears to become aligned in the trough with the side walls of the trough, an end of the trough remote from the loading hopper being open, a husking assembly receiving the ears of corn from the open end of the trough of the aligning bin, the husking assembly including a pair of rotatably mounted husking rolls receiving ears from the open end of the trough, axes of the rolls sloping downwardly away from the open end of the trough, and means for rotating the rolls to cause the rolls to engage husks and withdraw the husks from the ears as the ears progress along the rolls.

5. A machine for husking ears of corn which comprises a loading hopper, a discharge ram mounted in the loading hopper, means for driving the discharge ram to deliver ears of corn from the hopper, an aligning bin receiving the ears of corn from the loading hopper in randomly oriented relation, said aligning bin having a plurality of elongated troughs, each of said troughs having a bottom wall of approximately the width of an ear of corn and side walls sloping downwardly toward the trough bottom wall, a gate mounted above the aligning bin and engageable by ears of corn in the aligning bin, means connected to the gate and controlling the ram driving means so that the ram delivers the ears of corn when the level of ears in the aligning bin at the gate is below a predetermined level, means for vibrating the aligning bin lengthwise of the troughs to cause the ears to progress along the aligning bin, the side walls and bottom walls of the troughs causing the ears to become aligned in the troughs with the side walls of the troughs, ends of the troughs remote from the loading hopper being open, a husking assembly receiving the ears of corn from the open ends of the troughs of the aligning bin, the husking assembly including a pair of rotatably mounted husking rolls receiving ears from the trough, axes of the rolls sloping downwardly away from the open end of the trough, means for rotating the rolls to cause the rolls to engage husks and withdraw the husks from the ears as the ears progress along the rolls, upright skirt members pivotally mounted above the rolls and aligned with the rolls for guiding the ears as the ears fall from the open ends of the troughs to the husking section, and means for oscillating the skirt members transversely of the rolls to align the ears of corn with the rolls.

References Cited by the Examiner

UNITED STATES PATENTS

| | | | |
|---|---|---|---|
| 1,935,766 | 11/1933 | Coultas | 130—5 |
| 2,329,768 | 9/1943 | Kerr | 130—5 |
| 3,113,574 | 12/1963 | Greedy et al. | 130—5 |

ABRAHAM G. STONE, *Primary Examiner.*

JOE O. BOLT, *Examiner.*